Oct. 21, 1969 E. E. JENKINS 3,473,375
STRAIN GAGE TRANSDUCER
Filed Feb. 3, 1967
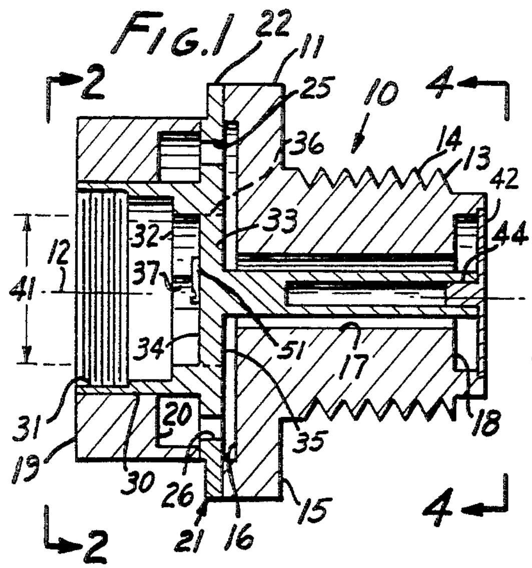
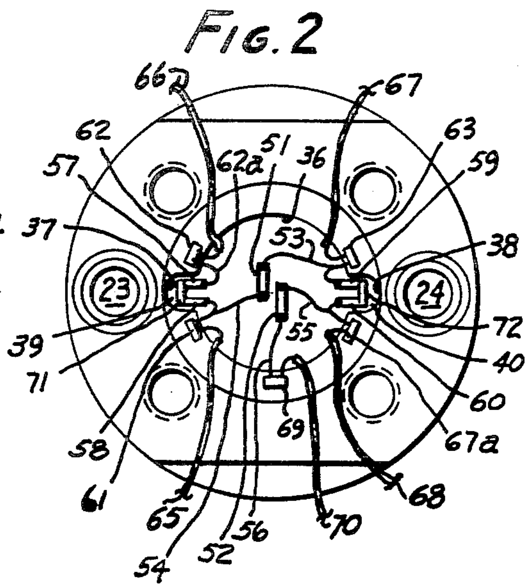
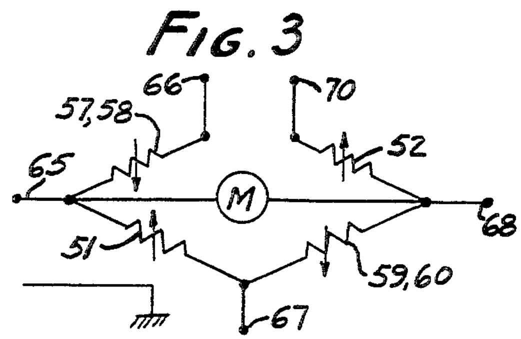
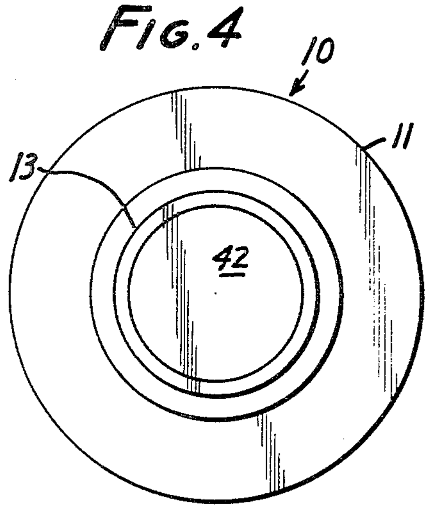
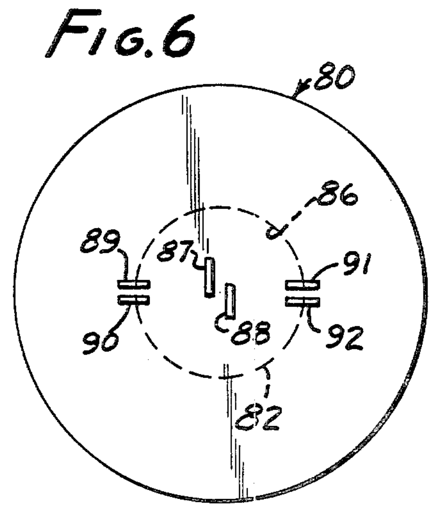
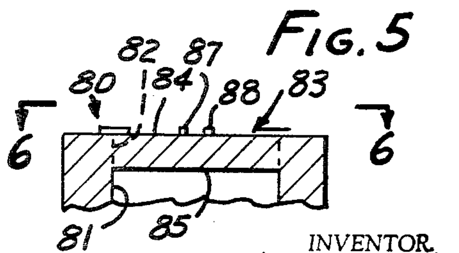
INVENTOR
EDWIN E. JENKINS
BY
Angus & Mon
ATTORNEYS.

United States Patent Office 3,473,375
Patented Oct. 21, 1969

3,473,375
STRAIN GAGE TRANSDUCER

Edwin E. Jenkins, Pasadena, Calif., assignor, by mesne assignments, to Whittaker Corporation, a corporation of California Filed Feb. 3, 1967, Ser. No. 613,900
Int. Cl. G01l 5/12, 7/08, 9/00
U.S. Cl. 73—141 8 Claims

ABSTRACT OF THE DISCLOSURE

This invention relates to a transducer which measures forces derived from direct physical contact or from fluid pressure by the use of a deformable diaphragm. The force is measured, by measuring, the strains produced in the diaphragm when it is deflected. The diaphragm has a first and a second face and is edge-supported by a body. The body forms at one of the faces a limiting perimeter which substantially defines that portion of the diaphragm which is deformable by the said force. The body contiguous to this perimeter at the face which bows convexly includes a plurality of regions continuous with the adjacent face, which regions are disposed laterally outside the perimeter. Means for measuring the force as a function of strain in the diaphragm comprises strain gages inside the perimeter and overlapping the perimeter, and which are adapted to be incorporated into a bridge circuit.

This invention relates to strain gage transducers. In the measurement of static and dynamic forces, both those which are physically contacted such as by direct loading, and those which are exposed to fluid pressures, it is conventional to measure the force by the use of a diaphragm which is edge-supported and deflects at its center in a bowing manner. The force is proportional to the deflection of the diaphragm. Conventional practice has been to make the diaphragm one plate of a capacitor, and to measure the deflection as a function of change in capacitance. This has a number of advantages, but also has a number of disadvantages which it is an objective of this invention to overcome.

With the advent of piezo-resistive devices, that is, devices whose resistance changes proportionately to their strain, it has become possible to measure deflections as a function of the lateral strain in a diaphragm. This makes possible a fast reacting device which is capable of being incorporated into a bridge circuit. However, these diaphragms are ordinarily integral with the body which supports them and their bending is a rather complex function. For a convex deflection, there is a tension at the center of the diaphragm and compression near the edge. Furthermore, it is desirable in making measurements of this type to produce the maximum possible signal so that the signal to noise ratio is most favorable. In conventional devices it is customary to apply strain gages at the center and near the edge of the diaphragm, but then there results near the edge a "dead" region, in which the compression stress is very low and is difficult to measure, and which may even be missing in the region available to the gage, and the effect is thereby reduced because it is necessary to space the strain gages somewhat inwardly from the edge of the diaphragm.

It is an object of this invention to provide means whereby the strain gages may be placed at the optimum locations to achieve the maximum signal output attainable from both tension and compression, and so as readily to be incorporated in simple readout circuits.

A device according to this invention includes a body that has an axis and a diaphragm which is edge-mounted to, and is laterally restrained at, its edge by the body. The diaphragm has a first and a second face, the faces being parallel to each other and normal to the axis. The first face bows convexly, and the second face bows concavely when positive force is applied to the second face. The body defines on at least one of said sides, a limiting perimeter of the diaphragm thereby substantially defining that portion of the diaphragm which is deformable by said forces.

The body contiguous to said perimeter on the first face includes a plurality of regions continuous with said first face which are disposed laterally outside the said perimeter. Means for measuring the force as a function of strain in the diaphragm comprises a pair of strain gages attached to the first face of the diaphragm at locations spaced inwardly from the perimeter, and a strain gage attached to the first face of the diaphragm at each of a plurality of the said regions, each of which gages overlaps the respective regions in the diaphragm area inside the perimeter contiguous thereto.

According to a preferred but optional feature of the invention, the limiting perimeter is formed by a body shoulder contiguous to the first face, the recesses being formed in the shoulder to form the said regions.

The above and other features of this invention will be fully understood from the following detailed description and the accompanying drawings, in which:

FIG. 1 is an axial cross-section of the presently preferred embodiment of the invention;

FIG. 2 is a left hand end view of FIG. 1;

FIG. 3 is a diagram of a circuit useful with the invention;

FIG. 4 is a right hand end view of FIG. 1;

FIG. 5 is a fragmentary axial cross-section of another embodiment of the invention; and FIG. 6 is a top view of FIG. 5 taken at line 6—6 of FIG. 5.

A transducer 10 according to the invention is shown in FIG. 1 which includes a body 11 having a central axis 12. The body includes a neck 13 with external threads 14 which adapt the device to be threaded into a port. A flange 15 is adapted to bear against the external surface of a body into which the transducer is threaded.

The neck of the transducer includes a cavity 16 which has a central passage 17, and also has a counterbore 18 at its free end. The body also includes a housing 19 which is ring-shaped, with a groove 20 therein for purposes yet to be described. An intermediate part 21 is also included in the body. The housing, intermediate part and neck are fused together. Originally they are made in separate parts, and then are furnace-brazed so as to form an integral and continuous structure.

The intermediate part includes a flange 22 which is joined to neck 13 and to housing 19 so that groove 20 forms a peripheral ring-shaped groove which is adapted to receive and discharge coolant fluid from port 23 to port 24. Similarly, flange 22 includes a pair of ports 25, 26 which give access to cavity 16 for coolant flow through the cavity.

The intermediate part also includes a tubular extension 30 which has internal threads 31 for attachment of auxiliary equipment, and is counterbored to form a shoulder 32 that is contiguous to a first diaphragm 33.

This first diaphragm has a first face 34 and a second face 35. The shoulder defines a limiting perimeter 36 which is best seen in FIG. 2. This perimeter is substantially a complete circle, even though interrupted over a minor portion of its circumference, and defines a region on the first face inside this perimeter which constitutes the "active" portion of the diaphragm. The term "active" portion is used in the sense that this is the part of the diaphragm which is able to deflect when forces are applied to it. Two recesses 37, 38 are formed such as by milling them in shoulder 32. The regions formed by the recesses 39, 40 are continuous with and contiguous to face 34. Dotted lines 36 in FIG. 1 are intended to illustrate the bounding regions of the active portion of the diaphragm as delimited by the perimeter. The recesses form no part of the perimeter. The perimeter for all practical purposes continues as a circle across the regions.

The second face of the diaphragm faces into the cavity. A second diaphragm 42 is also edge-mounted to the body and extends across the opening of the neck so as to close cavity 16. It has a central portion which is deflectible by force applied thereto, and has a post extension 44. The second diaphragm, the post on the first diaphragm, and post extension are brazed together along with the rest of the device so as to be unitary. Flexure of the second diaphragm 42 will result in flexure of the first diaphragm.

In FIG. 1 the diameters of the diaphragms are shown to be equal. It is to be understood that the ratio could be larger or smaller. For example, diaphragm 42 could be larger than diaphragm 33 so as to produce a larger force on the post and thereby provide an amplification effect to the first diaphragm.

To this basic structure there is attached means for measuring the strains inducted on the diaphragm by forces or pressures applied thereto in order to readout the forces or pressures themselves. This means includes a pair of strain-sensitive elements 51, 52 which are disposed within the perimeter near the center thereof. Preferably these are piezo-resistive elements whose resistance varies with the strain (both tensile and compressive) exerted on them. They are bonded by conventionally known means to the first face, and share the strains at the surface thereof. Leads 53, 54 are attached to element 51 and leads 55, 56 are attached to element 52.

Within the regions 39, 40 and overlapping both the respective regions and the areas of the first diaphragm contiguous thereto, are a plurality of pairs of similar elements. In region 39 there are elements 57, 58; in region 40 there are elements 59, 60. These elements are affixed to the first face and the regions in the same manner as elements 51, 52. They are connected in series with each other in their respective pairs by bridge connectors 71, 72 respectively. The connections and leads shown create a bridge circuit which is best illustrated in FIG. 3. Connector block 61 connects lead 65 to elements 51 and 58 by branched lead 54. Connector block 62 connects lead 66 to element 57 by lead **62*a*. Connector block 62 connects lead 66 to element 57 by lead 62*a*. Connector block 63 connects lead 67 to elements 51 and 59 by branched lead 53. Connector block 67*a* connects lead 68 to elements 52 and 60 by branched lead 55. Connector block 69 connects lead 70 to element 52 by lead 56**. The connector blocks are mounted to and insulated from the body. They provide convenient means for assembly and maintenance of the circuit.

When pressure or force is applied on the second face such as by a motion of the second diaphragm to the left in FIG. 1, elements 51, 52 will be plcaed in tension and elements 57, 58, 59, 60 will be placed in compression. Their effect in the bridge circuit will be evident to a person skilled in the art. It is to be understood that while FIG. 1 shows a device which can be fluid cooled by the use of a double diaphragm, it is equally possible to manufacture a device in which the neck portion is removed and in which the first diaphragm is completely smooth and flush and directly receives the force or fluid pressure.

The effect of the strain-sensitive elements which are mounted in regions 39 and 40 is to avoid the "dead" region which exists between the tension and compression effects on the first face of the diaphragm which dead region is slightly spaced from the limiting perimeter. Instead they permit these devices to be located at precisely the area of greatest compressive reaction.

The generality of this invention can best be understood from an examination of FIG. 5, which, while not a particularly desirable embodiment, is still workable and illustrates the invention in its ultimate concept. In this case a body 80 is shown which as a cavity 81, the body being considered as a continuous cylinder which carries on along the dotted line 82. A diaphragm 83 includes a first face 84 and a second face 85. The body forms a limiting perimeter 86, in this case on the second instead of on the first face. As can best be seen, a pair of strain-sensitive elements 87, 88 are bonded to the central portion of the diaphragm on its first face, and overlapping the perimeter there are another two pairs of strain-sensitive elements comprising elements 89, 90, 91, 92 mounted as best seen in FIG. 6. These may be connected into a circuit similar to that of FIG. 3, and be the same type of element.

This invention thereby provides a means whereby the regions of greatest tension may readily be measured by strain-sensitive elements attached near the center of the diaphragm in a substantially symmetrical array, and the regions of compressive effect may be registered at the edge of the region where the compression is the greatest, in sharp contrast with the conventional devices wherein such a region is not available, both because of the size of the piezo-resistive elements and also because of the requirement of providing leads and the like to them, all of which require the elements to be attached at a significant spacing from the limiting perimeter. The arrangements of this invention enables a larger signal to be obtained for a given deflection.

This device thereby provides a transducer which is resistive to and reliable over wide ranges of pressures and temperatures, which is enabled to have flush diaphragm construction, which is small in size, readily calibrated, which has a negligible volumetric displacement, which is insensitive to vibration and shock and which has a high output voltage, all in marked contrast to existing devices.

In use, the gages form a bridge which is open at the positive input. This bridge is ordinarily supplied with about 15 milliamperes from a constant current source that has an output impedance of approximately 5,000 ohms. This impedance may be obtained by the use of 5,000 ohms in parallel with a high impedance constant current source, or 5,000 ohms in series with a constant voltage source. To facilitate zero adjustment, the positive side of the constant current supply should be applied to the wiper of a 100 ohms potentiometer with each end of the potentiometer connected to the open legs (66, 70) of the bridge. The meter or measuring device is connected across 65, 68. Point 67 is negative. The piezo-resistive elements may conveniently be silicon semiconductor strain gages. Gages 51 and 52 may be such as type AEP–350–090S. Gages 57 and 58 are obtainable unitarily with their bridge connectors, as are gages 59 and 60 with their bridge connectors. The assemblies 57, 58 and 59, 60 may be type VEP–350–060B. Both types can be obtained under these designations from Kulite Semiconductor Products, Inc., 1030 Hoyt Ave., Ridgefield, N.J.

What is claimed:

1. A transducer comprising: a composite body member including a first deformable diaphragm which is edge supported, said first diaphragm having a first and a second face, the faces being parallel to each other and normal to the longitudinal axis of the body member, the first face bowing convexly and the second face bowing concavely when a force is applied to the second face; a body shoulder contiguous to said first face defining a limiting perimeter on said first face which substantially defines that portion of the diaphragm which is deformable by said force; recesses formed in said shoulder continguous to said perimeter on the first face defining a plurality of regions continuous with said first face which are disposed laterally outside the said perimeter; and means for measuring said force as a function of the strain experienced by said first diaphragm comprising a pair of strain gages attached to the first face of said first diaphragm at locations spaced inwardly from the perimeter, and strain gages attached to the first face of the first diaphragm at each of a plurality of said regions, which last-named strain gages overlap their respective region and the diaphragm area inside the perimeter contiguous thereto.

2. A transducer according to claim 1 in which the strain gages are piezo-resistive elements.

3. A transducer according to claim 1 in which the strain gages are connected in individual branches of a bridge circuit.

4. A transducer according to claim 1 in which a cavity is formed in the body contiguous to the second face, and in which a second deformable diaphragm is mounted to the body so as to be edge supported thereby, and to close the cavity, and in which a post joins the diaphragms to transmit force from the second to the first diaphragm.

5. A transducer according to claim 4 in which fluid-conveying ports are formed in the body, entering the cavity, to permit flow of coolant fluid through the cavity.

6. A transducer according to claim 4 in which the strain gages are connected in individual branches of a bridge circuit.

7. A transducer according to claim 1 in which the members of the pair of strain gages are piezo-resistive elements bonded to the first face in equal-but-opposite relationship, and in which the strain gages mounted in the said regions are formed in respective serially-connected pairs, the members of the pair on the diaphragm being connected in respective branches of a bridge circuit, and the pairs at the regions being connected in respective branches of the same bridge circuit, the circuit having four branches.

8. A transducer according to claim 7 in which the strain gages are connected in individual branches of a bridge circuit.

References Cited

UNITED STATES PATENTS

| | | | |
|---|---|---|---|
| 2,741,128 | 4/1956 | Gadd et al. | 73—398 |
| 3,219,035 | 11/1965 | Pressman et al. | 73—398 XR |
| 3,325,761 | 6/1967 | McLellan | 73—398 XR |
| 3,335,381 | 8/1967 | Giovanni | 338—4 |
| 3,341,794 | 9/1967 | Stedman | 73—398 XR |
| 3,358,511 | 12/1967 | Bargen | 73—398 |

CHARLES A. RUEHL, Primary Examiner

U.S. Cl. X.R.

73—398